(12) United States Patent
Kramer et al.

(10) Patent No.: US 6,829,543 B2
(45) Date of Patent: Dec. 7, 2004

(54) SAMPLING METHOD FOR FLOWMETERS

(75) Inventors: Beat Kramer, Windisch (CH); Daniel Matter, Brugg (CH); Thomas Kleiner, Fislisbach (CH)

(73) Assignee: ABB Research LTD, Zurich (CH)

(*) Notice: Subject to any disclaimer, the term of this patent is extended or adjusted under 35 U.S.C. 154(b) by 0 days.

(21) Appl. No.: 10/187,606

(22) Filed: Jul. 3, 2002

(65) Prior Publication Data

US 2003/0014198 A1 Jan. 16, 2003

(30) Foreign Application Priority Data

Jul. 16, 2001 (DE) .......................... 101 34 456

(51) Int. Cl.$^7$ .................................................. G01F 1/00
(52) U.S. Cl. ....................................................... 702/45
(58) Field of Search ................ 702/45, 60; 340/87; 73/861; 600/454; 703/1, 31; 429/22; 422/105; 423/247; 33/65; 364/492; 715/80; 380/4, 23

(56) References Cited

U.S. PATENT DOCUMENTS

| | | | |
|---|---|---|---|
| 4,075,699 A | | 2/1978 | Schneider et al. |
| 4,236,217 A | | 11/1980 | Kennedy |
| 4,581,705 A | * | 4/1986 | Gilker et al. ............... 702/60 |
| 4,672,331 A | * | 6/1987 | Cushing .................... 331/65 |
| 5,621,177 A | * | 4/1997 | Torimaru ................. 73/861.16 |
| 2001/0011881 A1 | * | 8/2001 | Emori et al. ............. 320/116 |

FOREIGN PATENT DOCUMENTS

| | | | |
|---|---|---|---|
| EP | 0014038 A1 | 8/1980 | |
| EP | 1164361 A1 | 12/2001 | |
| JP | 10246662 A | 9/1998 | |
| JP | 10-246662 | * 9/1998 | ........... G01F/15/75 |
| SU | 659928 A | * 4/1979 | |
| WO | WO98/52061 | 11/1998 | |
| WO | WO01/96819 A1 | 12/2001 | |

* cited by examiner

Primary Examiner—John Barlow
Assistant Examiner—Tung Lau
(74) Attorney, Agent, or Firm—Burns, Doane, Swecker & Mathis, L.L.P.

(57) ABSTRACT

The subject matter of the present invention is a sampling method for flowmeters, in the case of which the sampling rate is reduced as a function of the remaining power source service life. The latter is extended thereby with loss of accuracy.

14 Claims, 1 Drawing Sheet

SAMPLING METHOD FOR FLOWMETERS

CROSS REFERENCE TO RELATED APPLICATIONS

This application claims the priority of the German patent application No. 101 34 456.2, filed on Jul. 16, 2001, the disclosure of which is incorporated herein by reference in its entirety.

FIELD OF THE INVENTION

The present invention relates to the field of autonomously powered flowmeters such as battery-operated gas meters or water meters.

BACKGROUND OF THE INVENTION

In the as yet unpublished European Patent Application No 00810511.6, a gas energy meter based on a cost-effective CMOS flow sensor is represented which determines the natural gas consumption and renders calibration possible in standard volume or directly in gas energy on the basis of the applied measuring method. Calibration in standard volume is possible by virtue of the fact that the new gas meter determines the mass flow (independently of pressure and temperature), and therefore it is easy to accomplish the conversion into a volume corresponding to the gas under standard conditions (for example 20° C., 1 bar). Since the measuring signal of this new gas meter is correctly weighted on the basis of its sensitivity with reference to the three main components (methane, ethane and propane) in accordance with their specific calorific values, it is possible in addition to calibrate the meter directly in energy.

In the case of such a gas meter, physical magnitudes such as mass flow, volumetric flow or gas energy are measured periodically, for example every two seconds. These instantaneous values are subsequently integrated in the gas meter itself, and the integrated total consumption is transferred periodically, for example every month or half year, to a control center.

Electronic flowmeters such as water meters, hot water meters, electric energy meters or gas meters are mostly powered by a battery. It is required in this case that the meter can be operated for a few years without a change of battery. The state of the battery must be monitored continuously. A warning must be output approximately half a year before expiry of the service life of the battery (for example by means of the status display of LOW BAT). If the battery is not replaced in this half year, the gas meter is no longer powered and it can no longer be guaranteed to function. The gas supplier thereby loses measured values and receipts for the consumption on those days in which the meter is not running.

The gas meter measures the gas flow rate at a maximum sampling rate of 0.5 measurements/second (measuring interval of 2 seconds). A satisfactorily high accuracy is thereby achieved for the meter. If the measuring interval is increased, there is a drop in accuracy.

SUMMARY OF THE INVENTION

It is a general object of the present invention to enhance the readiness of the battery-powered or otherwise autonomous flowmeters for use or measurement.

The core of the invention is to reduce the sampling rate shortly before the predictable end of the autonomous power source. As a result, fewer samplings are made per time unit, accuracy being lost, and the service life of the power source is lengthened.

It is more important in this connection to record measured values even if these do not reach the same accuracy as during operation of the meter with the normal sampling rate. However, in return the supplier has information over a longer time interval on the actual gas consumption, and thus has a basis for billing.

In the context of this application flowmeter signifies any meter capable of measuring a volume flow, mass flow, energy flow or other characteristic flow of a fluid, such as a gas or liquid, or fluid-like material. Autonomous power source signifies any power source capable to deliver power or energy, e.g. in electric, optic or other form, to a flowmeter without being supplied from a power line or other power supply network at least for a certain period of time. Examples of such autonomous power sources are batteries, battery packs, accumulators or other energy storage media with a limited energy storage capacity and hence limited energy supply lifetime or service life. A residual service life is an expected, calculated or otherwise anticipated time period defining th e time until the autonomous power source is running out of energy and therefore comes to an end. The term flowmeter may also relate to a set of flowmeters connected to a single autonomous power source or to a set of possibly interconnected autonomous power sources that provide energy for a limited amount of time when disconnected from a main power supply (i.e. when operated autonomously).

DESCRIPTION OF THE DRAWINGS

The invention is explained in more detail below with the aid of exemplary embodiments in conjunction with the drawings, where.

DETAILED DESCRIPTION OF THE INVENTION

Figure 1:
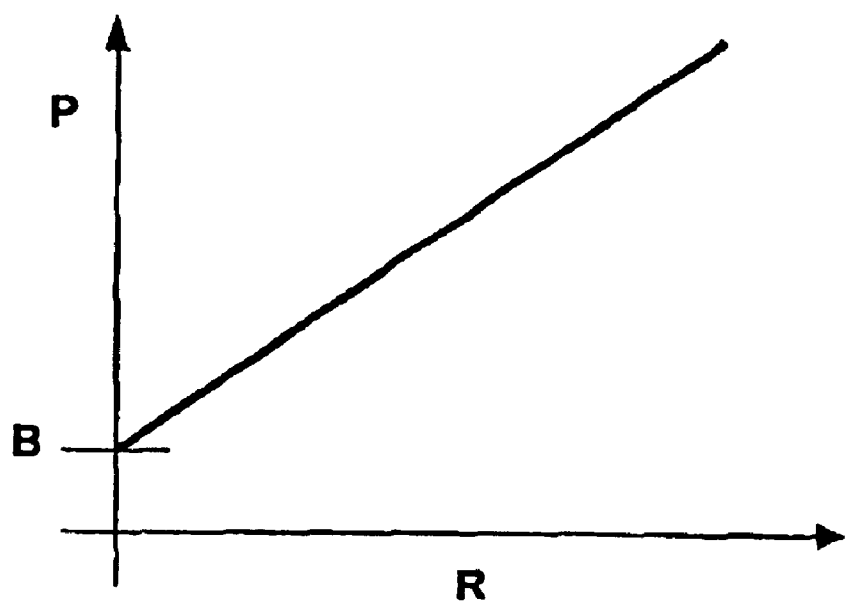
FIG. 1 shows the power consumption of a flowmeter as a function of the sampling rate.

The power P consumed by a flowmeter is illustrated in FIG. 1 as a function of a sampling rate R. The power consumption of the meter comprises a certain base load B (display with driver, microcontroller in sleep mode, leakage currents of other components) and a component that increases essentially linearly in relation to the sampling rate R (sensor, microcontroller in operation). In the normal case, the meter is operated at an optimum sampling rate with reference to power consumption and measuring accuracy.

Figure 2:
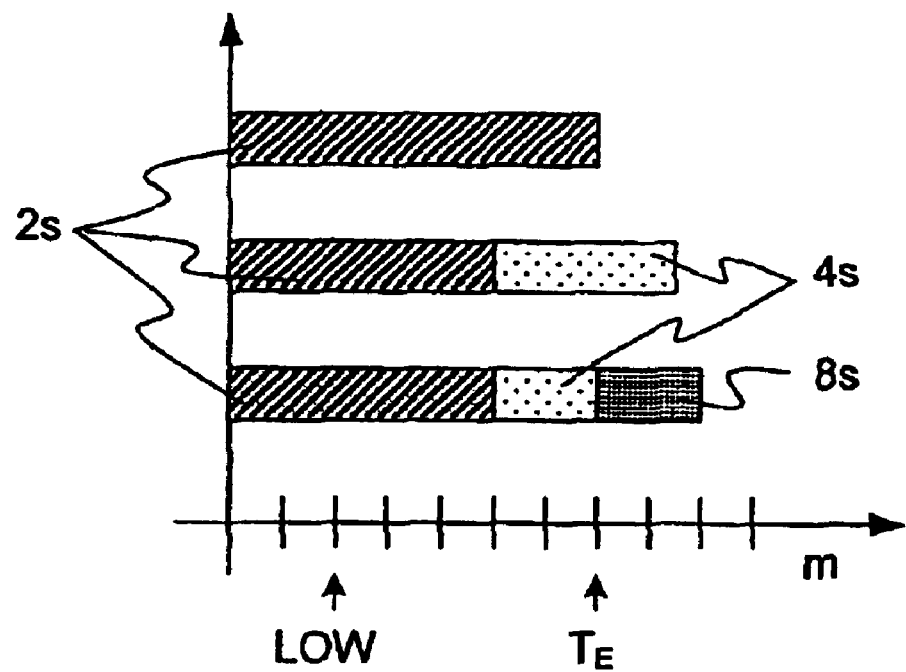
FIG. 2 shows a diagram of the lengthening of service life according to the invention.

It is illustrated in FIG. 2 on a timescale with monthly divisions how the service life of the power source can be lengthened thanks to the adaptation, according to the invention, of the measuring interval by at least two months over the predicted end $T_E$. A battery state display that prompts the batteries to be changed appears at the instant LOW. If this is three months after the first appearance of LOW status, or has not yet occurred in the case of undershooting of a residual service life defined, for example, by a supply voltage threshold, a change is made to half the sampling rate, that is to say the measuring interval is increased from 2s to 4s. The measuring accuracy of the meter is thereby reduced, but approximately three to three and a half months of residual service life have been created from the originally remaining two months. After a further two months, that is to say in accordance with FIG. 2 at the originally predicted end of the power source $T_E$, the same procedure can be carried out anew by halving the changed sampling rate once again or doubling the measuring interval to 8s. The overall service life of the power source is thereby increased to more than two months beyond $T_E$.

What is claimed is:

1. A sampling method for flowmeters having an autonomous power source, instantaneous flowrate values being determined at a specific sampling rate and integrated, the power consumed by the flowmeter being a function of the sampling rate, wherein the sampling rate is a function of a residual service life of the autonomous power source such that the sampling rate is reduced upon undershooting of a first residual service life and, as a result, accuracy is lost and a service life of the power source is lengthened.

2. The sampling method as claimed in claim 1, wherein the autonomous power source is a battery and the residual service life is derived from the battery voltage.

3. Use of a sampling method as claimed in claim 1 in a flowmeter, wherein the flowmeter is a water meter, hot water meter, electric energy meter or a gas meter.

4. The method of claim 1, wherein the sampling rate is halved upon undershooting of the first residual service life.

5. Use of a sampling method as claimed in claim 2 in a flowmeter, wherein the flowmeter is a water meter, hot water meter, electric energy meter or a gas meter.

6. The sampling method of claim 1, wherein measured values are recorded even if these do not reach the same accuracy as during operation of the flowmeter with a normal sampling rate, such that the flowmeter is no longer operated at an optimum sampling rate with reference to power consumption and measuring accuracy.

7. The sampling method as claimed in claim 1, wherein the power consumption of the flowmeter comprises a certain base load and a component that increases essentially linearly in relation to the sampling rate.

8. The sampling method of claim 1, wherein the flowmeters measure gas consumption when the sampling rate is reduced a supplier of the gas has information over a longer time interval on actual consumption of the gas, and thus has a basis for billing.

9. The method of claim 4, wherein the sampling rate is reduced once more upon undershooting of a second residual service life.

10. Use of a sampling method as claimed in claim 4, in a flowmeter, wherein the flowmeter is a water meter, hot water meter, electric energy meter or a gas meter.

11. The sampling method of claim 7, wherein the base load stems from a display with a driver, a microcontroller in sleep mode and from leakage currents of other components, and the increasing power consumption component stems from a sensor and a microcontroller in operation.

12. The method of claim 9, wherein the sampling rate is halved upon undershooting of the second residual service life.

13. Use of a sampling method as claimed in claim 9, in a flowmeter, wherein the flowmeter is a water meter, hot water meter, electric energy meter or a gas meter.

14. Use of a sampling method as claimed in claim 12 in a flowmeter, wherein the flowmeter is a water meter, hot water meter, electric energy meter or a gas meter.

* * * * *